E. SIEBENLIST.
Nipples for Nursing-Bottles.

No. 210,157.　　　　　　　　Patented Nov. 19, 1878.

Witnesses
Martin Tanner
A. Scott

Inventor
Emil Siebenlist
per Schickling
Attorney

UNITED STATES PATENT OFFICE.

EMIL SIEBENLIST, OF BERLIN, PRUSSIA.

IMPROVEMENT IN NIPPLES FOR NURSING-BOTTLES.

Specification forming part of Letters Patent No. 210,157, dated November 19, 1878; application filed May 23, 1878.

*To all whom it may concern:*

Be it known that I, EMIL SIEBENLIST, residing at Berlin, Prussia, have invented Improvements in India-Rubber Nipples for Infants' Feeding-Bottles, with a contrivance for admitting air, of which the following is a specification:

The present invention relates to certain improvements in nipples for infants' nursing or feeding bottles, whereby the entire closing or collapse of the nipple is prevented by reason of the pressure of the infant's gums upon the nipple.

It has heretofore been proposed to provide nipples of the character mentioned with internal ribs or projections, for the purpose of holding the same sufficiently distended or open at all times for enabling the flow of milk to take place. Nipples of this construction do not give an unobstructed flow of milk, and are less easily cleaned than nipples having smooth interior bores.

The invention consists in an india-rubber nipple for nursing-bottles provided with an air-induction tube which communicates with the interior of the nipple and with the atmosphere. The air-tube will admit sufficient air for preventing the collapse of the nipple by the suction created within the same when the infant is drawing milk from the bottle.

Figure 1:
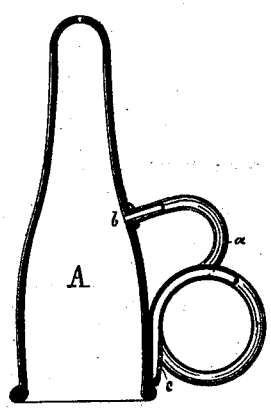
Figure 2:
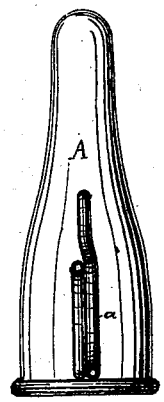
Figure 3:
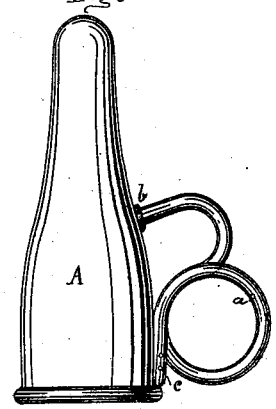
Figure 4:
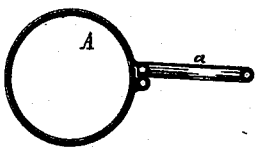

In the accompanying drawings, forming part of this specification, Figure 1 is a sectional elevation of a nursing-bottle having an air-vent or inlet-tube. Figs. 2 and 3 are face views of the nipple. Fig. 4 is a transverse section of the same.

The letter A designates an india-rubber nipple, which is of the ordinary form, and has the enlarged base for attaching it to the neck of a nursing-bottle. Air is admitted to the interior of the nipple when the same is in use by means of a small india-rubber or elastic tube, $a$, which is secured to the base of the nipple at its rear end, and communicates at its front end with the interior of the nipple, as shown at $b$. Small openings $c$, two or more, are made in the rear portion of the tube $a$ for admitting the air. The opening $b$ of the air-tube is small, so as to prevent the influx of any milk or liquid into the same; and for still further guarding against this result, the air-tube is wound spirally or is coiled, as is shown in the various figures of the drawing. The form of the air-tube, however, is not a material feature of the invention.

A nipple made as above described is used in the customary manner, and will not be liable to collapse or close when the pressure of the infant's gums is upon the same, the act of drawing in the milk causing the admission of external atmospheric air in a manner which will be readily understood.

In use, the outlet-opening of the air-tube leading into the nipple is located immediately over the mouth of the bottle, and the vent or air tube is preferably held on the upper side of the bottle.

I am aware that the stoppers and caps of nursing-bottles have been provided with vent-tubes for preventing a vacuum from being formed in the bottle; but I am not aware that an india-rubber nipple has been provided with such a vent-tube for enabling the nipple to be used in connection with an ordinary bottle without change of form or construction of the latter, and yet obtain the full advantages of the vent-tube.

Having thus described my invention, I claim as new and desire to secure by Letters Patent—

The india-rubber nipple having an external air-inlet or vent-tube formed integral therewith, and communicating with the interior of the nipple and the atmosphere, as and for the purpose set forth.

In testimony whereof I have signed my name to this specification in the presence of two subscribing witnesses.

EMIL SIEBENLIST.

Witnesses:
GERARD V. NAWROCKI,
BERTHOLD ROI.